United States Patent [19]

Lorkin et al.

[11] 3,852,107

[45] Dec. 3, 1974

[54] PROTECTION OF GRAPHITE ELECTRODES

[75] Inventors: Clive Graham Lorkin, Borken; Josef Schiffarth, Postfach, both of Germany

[73] Assignee: Foseco International Limited, Birmingham, England

[22] Filed: Nov. 27, 1972

[21] Appl. No.: 309,919

[30] Foreign Application Priority Data
Nov. 26, 1971 Great Britain.................... 55128/71

[52] U.S. Cl...................... 117/228, 106/54, 106/56, 252/502, 252/504
[51] Int. Cl............................................ B44d 1/44
[58] Field of Search ............... 117/228; 106/54, 55; 252/502, 504

[56] References Cited
UNITED STATES PATENTS
1,742,259   1/1930   Kelleher.......................... 117/228 X
1,948,382   2/1934   Johnson.......................... 117/228 X FOREIGN PATENTS OR APPLICATIONS
1,218,662   1/1972   Great Britain..................... 117/228

Primary Examiner—Mayer Weinblatt
Attorney, Agent, or Firm—Cushman, Darby & Cushman

[57] ABSTRACT

Graphite Electrodes are protected by coatings which do not extend over the parts of the electrode which fit in the clamps. Coatings comprise a matrix-forming material with a melting point of less than 1,000°C and a refractory filler.

13 Claims, No Drawings

PROTECTION OF GRAPHITE ELECTRODES

This invention relates to the protection of carbon against attack, e.g., by oxidation when subject to elevated temperatures, e.g., graphite crucibles, furnace linings, etc., but in particular to the reduction of oxidation losses of graphite electrodes such as furnace electrodes.

It has been shown that when a graphite electrode is used in the electric melting of steel in arc furnaces substantial electrode losses are encountered due to oxidation of the sides of the electrodes during use. As electrode costs are a very substantial part of the electric arc steel-making process, such losses are very costly. In severe cases, up to 70 percent by weight of the electrode may be oxidised from the side of the electrode and not in the arc itself. In view of the above many attempts have been made to protect arc furnace electrodes by protective coating, but until now these have met with very little success. Among attempts which have been made are those of British Pat. Specification Nos. 1,026,055, 1,218,662 and German Pat. No. 1,009,093. These specifications describe coatings of one or more layers including aluminium with boron/silicon/titanium alloys or compounds, iron with chromium/aluminium/silicon alloys or compounds, and titanium silicide/silver. Coatings may protect against attack by oxidation or corrosive gases and/or may protect against thermal attack.

In all these processes, the electrodes are coated prior to being put in to service in the furnace or the like. This leads to difficulties, because the electrode clamps, which supply current to the electrode cannot make direct electrical contact with the carbonaceous electrode material. Consequently the current has to pass through the applied coating, and since such coatings normally have specific resistances higher than those of the clamp and electrode materials, the coating in the region of the clamp becomes locally overheated. This can cause burning of the clamps themselves, and disruption of the coating so that when this part of the electrode is lowered, with respect to the clamp, into the furnace, the degree of protection is considerably reduced. Local overheating can also be caused if the coatings are uneven or have been damaged during the mounting of the electrode in the clamp, or, as may be the case with certain metallic coatings, by reaction or alloying with the clamp. Further, since the coatings suggested so far have normally been refractory and brittle, they do not readily accomodate changes in volume due to temperature fluctuations and tend to crack. Oxidation of the electrode then proceeds through the crack under the coating. Coatings which have failed, either in this way or by other degradation such as melting, evaporation or oxidation, are difficult to repair since the application processes do not lend themselves to repeated coating in situ.

According to the present invention the electrodes to be protected are treated with a protective coating prior to and/or during use in such a way that only that part of the electrode which is directly exposed to attack is coated, i.e., that part within the furnace itself and immediately above, but below the position of the clamps. Thus all or most of the electrode surface below the clamps will at any time be coated, so that the clamps themselves will always maintain electrical contact with the electrode surface directly avoiding local overheating. Furthermore, the nature of the protective material and its method of application enable further treatments of the electrode to be made as necessary, for example when the electrode is lowered as consumption takes place at the tip then fresh electrode must be protected, or to strengthen the initial coating to compensate for gradual degradation due to evaporation and/or other losses.

The material may be applied as a powder onto a hot electrode, or the material may be applied as a suspension in one or more liquids onto a hot or cold electrode by, for example, spraying, brushing, dipping, rolling or smearing.

The preferred mode of applying the coating is to pass the electrode through a spray ring or system of individual jets, hereafter referred to as the spray ring. Preferably the spray ring is located above, within or below the roof of the furnace, or adjacent to the furnace, so that the electrode may be lowered and raised through the spray ring by the usual electrode lowering and raising machinery. In these locations the electrode may remain in its clamp before spraying; The spraying system may be coupled to the electrode withdrawal mechanism to operate automatically during any raising or lowering of the electrode. Should this not be practical for certain furnaces then the electrode may be removed from its clamp for spraying away from the furnace, although again only that part of the electrode below the clamping level will be sprayed.

In order to minimise losses of coating material the application may be assisted electrostatically.

Alternatively, the electrode may be heated by external means before or after application of the coatings thereto, e.g., by flame or by induction, microwave, infra red etc. or other electrical heating so that at least the surface of the electrode attains the temperature necessary to render the coating adhesive.

The coating material comprises two basic components a matrix having a melting point preferably under 1,000°C, and a refractory filler. These may be suspended and/or dissolved in a liquid carrier, such as water. After application to the electrode and/or when the electrode is used in the furnace, the matrix fuses, to form a continuous coating sticking to the electrode surface. This molten matrix constitutes a layer of high impermeability, which property is further enhanced by the presence of the filler. Such a coating substantially reduces attack of the electrode by the furnace atmosphere.

A further very important property of the filler is to increase the viscosity of the matrix so that it does not drip off from the electrode, and the filler level is so adjusted that the coating is fluid/plastic over a wide temperature range thus easily accomodating temperature fluctuations without cracking.

It has been found that the matrix to filler ratio may vary between 90 percent matrix and 10 percent filler to 15 percent matrix and 85 percent filler depending on the temperature to which the sprayed coating is to be subjected. For the purposes of clarification the matrix/filler ratio according to the present invention is further illustrated below:

For a service temperature of 700°C we prefer a matrix/filler ratio in the coating of 65 – 85 percent matrix to 35 – 15 percent filler.

For a service temperature of 1,600°C we prefer a matrix/filler ratio in the coating of 25 – 50 percent matrix to 75 – 50 percent filler.

The proportions specified take into account the possibility of a matrix which contains "combined water" which is driven off immediately after application of the coating to the electrode.

As an example of this phenomenon the case of boric oxide versus boric acid is now illustrated where A ratio of 70 percent boric oxide to 30 percent filler is equivalent to a ratio of 80 percent boric acid to 20 percent filler.

Because the coating firmly adheres by virtue of the wetting of the electrode surface by the matrix, and because there is no tendency to crack, further layers of coating may be subsequently applied without risk of the previous layers flaking off. The adhesion of a coating layer may be enhanced by prior application to the surface to be treated of a coating of the matrix material or of a matrix enriched coating material or of a similar material which acts as an adhesive. This may be particularly desirable in the case of coatings to be applied directly to the graphite surface.

Suitable matrixes may be, for example, graphite wetting materials, e.g., boron containing compounds such as boric oxide, metaboric acid, boric acid, and salts of these acids, e.g., sodium borate or vanadium pentoxide etc, used alone or in combination together; or combinations of glaze-forming materials, e.g., phosphates, fluorides, silicates, etc., e.g., alkali metal phosphates, aluminium ortho phosphate, alkali metal silicates, glass, calcium fluoride, sodium aluminium fluoride, sodium borofluoride; or combinations of one or more graphite wetting materials with one or more of the glaze-forming materials. In the case of certain of these materials the addition of a suitable surface tension modifying agent such as chrome ore may be necessary to improve the wetting of the graphite.

Suitable fillers may be chosen from the refractory oxides carbides, nitrides or borides such as chromic oxide, zirconium oxide, titanium oxide, silicon carbide, zirconium carbide, wolfram carbide, boron nitride, titanium boride, zirconium boride, silicon nitride.

The particle size of the refractory filler material may comprise 80 percent of particles less than 0.5 mm preferably less than 0.2 mm and more preferably 0.06 mm.

Especially effective protective coating compositions are those comprising matrixes based on boron compounds with refractory carbide fillers. In certain applications the coatings may benefit from the inclusion of a small proportion of refractory fibrous material such as asbestos slag wool, glass fibre or aluminosilicate fibre, etc., the amount used generally not exceeding 10 percent by weight. In particular coatings comprising a matrix of boric oxide or boric acid with a silicon carbide filler have proved especially effective, initial trials having shown reductions in electrode consumption of up to 45 percent.

EXAMPLE

To a hot electrode measuring 180 mm diameter for use in a 4 ton capacity furnace there was applied a dry powder coating comprising 50 percent silicon carbide and 50 percent boron oxide ($B_2O_3$). This ratio of filler/matrix was achieved by spraying a mixture having the ratio 75 percent filler to 25 percent matrix. The ratio of 50/50 resulting from wastage of a portion of the non-adhesive filler material. The coating was applied at the rate of 2.5 kg/100 sq decimetres to provide, on fusing onto the surface of the electrode, a coating approximately 1 mm thick.

The coating was reapplied at intervals of approximately 2 hours (i.e., twice per charge).

After 4 charges in comparison to an uncoated electrode of equal dimensions it was found that electrode consumption had been reduced by 45 percent.

We claim as our invention:

1. In a method of protecting an arc furnace electrode formed of graphite wherein the electrode is held by means of clamps in the arc furnace, the improvement which comprises applying to the electrode a protective coating comprising 15 – 90 percent by weight of matrix material having a melting point of less than 1,000°C and which is a graphite-wetting material, and 10 – 85 percent by weight of a refractory filler, the protective coating being applied over only that part of the electrode which, in use, is below the level of the electrode clamps.

2. The method of claim 1 wherein the coating is applied by passing the electrode through a spray ring while spraying coating composition onto the surface of the electrode.

3. The method of claim 1 wherein the coating is applied to the electrode surface while that surface is hot.

4. The method of claim 1 wherein the filler is a refractory carbide.

5. The method of claim 1 wherein the filler consists to an extent of at least 80 percent by weight of particles of size less than 0.2 mm.

6. The method of claim 1 wherein the matrix component comprises at lease one boron compound.

7. The method of claim 1 wherein the matrix component comprises at least one glaze-forming material.

8. The method of claim 1 wherein the matrix component comprises vanadium pentoxide.

9. The method of claim 1 wherein the matrix component comprises at least one material selected from the class consisting of boron compounds and vanadium pentoxide together with at least one glaze-forming material.

10. The method of claim 1 wherein the coating comprises up to 10 percent by weight of refractory fibrous material.

11. The method of claim 1 wherein the applied coating is 0.5 to 5 mm thick.

12. An arc furnace electrode protected by the method of claim 1.

13. In the method of protecting a graphite electrode held in clamps and used in an arc furnace in the melting of steel, in which a protective coating composition comprising by weight 15 – 90 percent of a matrix material having a melting point of less than 1,000°C and which is graphite-wetting, and 10 – 85 percent of a refractory filler is applied to the outer surface of the graphite electrode, the improvement which comprises applying said protecting coating composition only to the outside of the electrode below the level of the clamps and leaving the outside of the electrode engaged by the clamps free from applied coating composition.

* * * * *